US011915168B2

(12) United States Patent
Rakshit et al.

(10) Patent No.: US 11,915,168 B2
(45) Date of Patent: Feb. 27, 2024

(54) IN-FLIGHT SERVICING OF AN AERIAL VEHICLE (71) Applicant: INTERNATIONAL BUSINESS MACHINES CORPORATION, Armonk, NY (US)

(72) Inventors: Sarbajit K. Rakshit, Kolkata (IN); Eric V. Kline, Pine Island, MN (US); Brian Beaman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 17/080,914

(22) Filed: Oct. 27, 2020

(65) Prior Publication Data
US 2022/0129826 A1    Apr. 28, 2022

(51) Int. Cl.
*G06Q 10/06* (2023.01)
*G06Q 10/00* (2023.01)
(Continued)

(52) U.S. Cl.
CPC ...... *G06Q 10/063114* (2013.01); *B60L 53/80* (2019.02); *B64C 39/024* (2013.01);
(Continued)

(58) Field of Classification Search
CPC ......... B60U 50/34; B60U 50/35; B60L 53/80; B60L 53/60; B60L 53/62; B60L 53/66;
(Continued)

(56) References Cited

U.S. PATENT DOCUMENTS

| 7,714,536 B1 | 5/2010 | Silberg et al. |
| 8,056,860 B2 | 11/2011 | Small et al. |

(Continued)

FOREIGN PATENT DOCUMENTS

| EP | 3177531 B1 | 1/2019 | |
| KR | 10-2019-0092787 | * 8/2019 | ............. B64C 39/02 |

OTHER PUBLICATIONS

Translation of KR 10-2019-0092787 (Year: 2019).*
(Continued)

*Primary Examiner* — Russell Frejd
*Assistant Examiner* — Sara J Lewandroski
(74) *Attorney, Agent, or Firm* — CANTOR COLBURN LLP; Tihon Poltavets (57) ABSTRACT

Embodiments include methods, systems, and computer program products method for aerial vehicle in-flight servicing. The computer-implemented method includes monitoring, using a processor, an aerial vehicle status of a delivery aerial vehicle. The processor compares the aerial vehicle status of the aerial vehicle to a delivery schedule associated with the delivery aerial vehicle. The processor further assigns a service aerial vehicle to provide service in response to the aerial vehicle status conflicting with the delivery schedule associated with the delivery aerial vehicle. The method further couples the delivery aerial vehicle to the service aerial vehicle while the delivery aerial vehicle and service aerial vehicle are in-flight. The method further provides power source assistance or aerial vehicle component assistance to the delivery aerial vehicle by the service aerial vehicle while the delivery aerial vehicle and service aerial vehicle are in-flight.

17 Claims, 6 Drawing Sheets

(51) Int. Cl.
*B60L 53/80* (2019.01)
*B64C 39/02* (2023.01)
*G06Q 10/0631* (2023.01)
*G06Q 10/20* (2023.01)
*B64U 50/19* (2023.01)
*B64U 50/34* (2023.01)

(52) U.S. Cl.
CPC ............ *G06Q 10/20* (2013.01); *B64U 50/19* (2023.01); *B64U 50/34* (2023.01)

(58) Field of Classification Search
CPC ...... B64C 39/024; B64U 50/34; B64U 50/39; B64U 80/00; B64U 80/10; B64U 80/20; B64U 80/25; B64U 80/30; G06Q 10/0631; G06Q 10/06311; G06Q 10/063114; G06Q 10/20
See application file for complete search history.

(56) References Cited

U.S. PATENT DOCUMENTS

| | | |
|---|---|---|
| 9,561,852 B1 | 2/2017 | Beaman et al. |
| 10,017,265 B1 | 7/2018 | Larsen |
| 10,476,296 B1 | 11/2019 | Rausch et al. |
| 10,611,252 B2 | 4/2020 | Wang et al. |
| 2012/0209456 A1 | 8/2012 | Harmon et al. |
| 2016/0325834 A1 | 11/2016 | Foster |
| 2017/0069214 A1 | 3/2017 | Dupray et al. |
| 2017/0203857 A1* | 7/2017 | O'Toole ............... B64C 39/024 |
| 2018/0312069 A1 | 11/2018 | McClymond |
| 2019/0047698 A1 | 2/2019 | Jassowski et al. |
| 2019/0047701 A1* | 2/2019 | Winkle ................ H02J 7/342 |
| 2020/0354056 A1* | 11/2020 | Borras ................ H04L 67/12 |

OTHER PUBLICATIONS

Atherton, Kelsey D. "Tech Inspired By Nikola Tesla Charges Drones In Mid-Air—Imagine flying robots that never had to land, ever", Popular Science Aviation; retrieved at: https://www.popsci.com/nikola-tesla-inspired-tech-powers-drone-in-mid-air-using/; dated Oct. 21, 2016; 12 pgs.

Dale, Daniel R. "Automated Ground Maintenance and Health Management for Autonomous Unmanned Aerial Vehicles", MIT, Department of Engineering in Elictrical Engineering and Computer Science, May 25, 2007, pp. 1-101.

Green Car Congress "In-flight wireless power transfer for drones" retrieved at: https://www.greencarcongress.com/2016/10/20161021-dronewpt.html; dated Oct. 21, 2016; 10 pgs.

Petricca, Luca "Micro and Nano Technologies for Unmanned Nano Air Vehicles (NAVs)", Doctoral Thesis; Buskerud and Vestfold University College, Faculty of Technology and Maritime Science, 2014, pp. 1-79.

Smith, Colin "Flying drones could soon re-charge whilst airborne with new technology", Imperial College London; retrieved at: http://www.imperial.ac.uk/news/175318/flying-drones-could-soon-re-charge-whilst/; dated Oct. 20, 2016; 3 pgs.

Whittle, Richard "How It Works: Laser Beaming Recharges UAV in Flight" Popular Mechanics; retrieved at: https://www.popularmechanics.com/flight/drones/a7966/how-it-works-laser-beaming-rech . . . ; dated Jul. 28, 2012; 8 pgs.

\* cited by examiner

IN-FLIGHT SERVICING OF AN AERIAL VEHICLE

BACKGROUND

The present invention relates in general to power maintenance or service for aerial vehicles and more specifically, to servicing autonomous aerial vehicles during flight.

Autonomous aerial vehicles (aerial vehicles) are expected to be ruled eligible for use by private and corporate entities subject to pending to regulations implemented by various aviation authorities such as, for example, the Federal Aviation Admiration (FAA). Proposed uses for aerial vehicles include, but are not limited to, package delivery, and image capturing. Therefore, it is envisioned that users could purchase aerial vehicles to achieve a certain set of needs or tasks such as delivering a payload from a warehouse to a customer.

SUMMARY

Embodiments of the invention are directed to a method for aerial vehicle in-flight servicing. A non-limiting example of the computer-implemented method includes monitoring, using a processor, an aerial vehicle status of a delivery aerial vehicle. The processor compares the aerial vehicle status of the delivery aerial vehicle to a delivery schedule associated with the delivery aerial vehicle. The processor further assigns a service aerial vehicle to provide service in response to the aerial vehicle status conflicting with the delivery schedule associated with the delivery aerial vehicle. The method further couples the delivery aerial vehicle to the service aerial vehicle while the delivery aerial vehicle and service aerial vehicle are in-flight. The method further provides power source assistance or aerial vehicle component assistance to the delivery aerial vehicle by the service aerial vehicle while the delivery aerial vehicle and service aerial vehicle are in-flight.

Embodiments of the invention are directed to a computer program product that can include a storage medium readable by a processing circuit that can store instructions for execution by the processing circuit for performing a method for aerial vehicle in-flight servicing. The method includes monitoring an aerial vehicle status of a delivery aerial vehicle. The processor further compares the aerial vehicle status of the delivery aerial vehicle to a delivery schedule associated with the delivery aerial vehicle. The processor further assigns a service aerial vehicle to provide service in response to the aerial vehicle status conflicting with the delivery schedule associated with the delivery aerial vehicle. The method further couples the delivery aerial vehicle to the service aerial vehicle while the delivery aerial vehicle and service aerial vehicle are in-flight. The method further provides power source assistance or aerial vehicle component assistance to the delivery aerial vehicle by the service aerial vehicle while the delivery aerial vehicle and service aerial vehicle are in-flight.

Embodiments of the invention are directed to a system. The system can include a processor in communication with one or more types of memory. The processor can be configured to monitor an aerial vehicle status of a delivery aerial vehicle. The processor can be configured to compare the aerial vehicle status of the delivery aerial vehicle to a delivery schedule associated with the delivery aerial vehicle. The processor can be configured to assign a service aerial vehicle to provide service in response to the aerial vehicle status conflicting with the delivery schedule associated with the delivery aerial vehicle. The system can be configured to couple the delivery aerial vehicle to the service aerial vehicle while the delivery aerial vehicle and service aerial vehicle are in-flight. The system can be configured to provide power source assistance or aerial vehicle component assistance to the delivery aerial vehicle by the service aerial vehicle while the delivery aerial vehicle and service aerial vehicle are in-flight.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The forgoing and other features, and advantages of the disclosure are apparent from the following detailed description taken in conjunction with the accompanying drawings in which.

The diagrams depicted herein are illustrative. There can be many variations to the diagram or the operations described therein without departing from the spirit of the invention. For instance, the actions can be performed in a differing order or actions can be added, deleted, or modified. In addition, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, embodiments of the invention are related in general to aerial vehicle maintenance/service while the aerial vehicle is in-flight. Aerial vehicles can be used for a variety of tasks, for example, delivering packages. However, during transportation of packages, there may be instances in which an available power for an aerial vehicle transporting the package is not sufficient to travel to the delivery destination, or damage to the aerial vehicle prevents travel to the delivery destination. Accordingly, delivery of the package is delayed because the aerial vehicle has to land in order to replace the power source (ex., a battery) to have sufficient power to reach the delivery destination and/or replace components of the aerial vehicle to reach the delivery destination.

Turning now to an overview of the aspects of the invention, one or more embodiments of the invention address the above-described shortcomings of the prior art by replacing aerial vehicle power sources or damaged aerial vehicle components while the aerial vehicle is in-flight. A service aerial vehicle can be used to replace a power source (ex., battery) or other parts of a designated delivery aerial vehicle, while the delivery aerial vehicle remains in-flight in order for the delivery aerial vehicle to remain operational and reach a destination, which would have previously been out of range for the aerial vehicle.

The above-described aspects of the invention address the shortcomings of the prior art by reducing time and effort to replace one or more batteries of a delivery aerial vehicle while in-flight instead of having to land and wait for service. Aspects of the invention can also employ a service aerial vehicle having one or more transfer mechanism and transporting one or more spare batteries in order to transfer at least one spare battery or power from at least one battery to a target delivery aerial vehicle.

Figure 1:
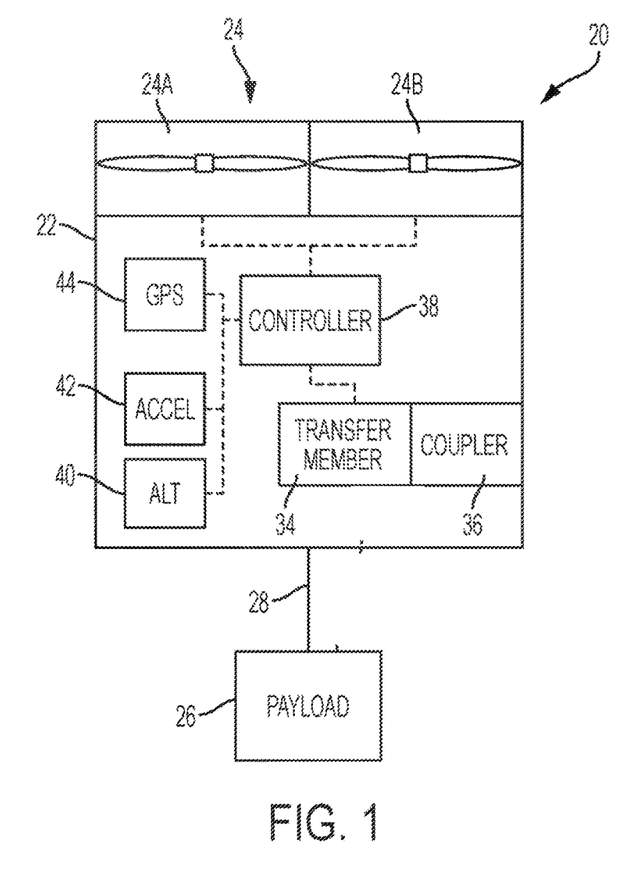
FIG. 1 depicts a block diagram of an autonomous aerial vehicle according to one or more embodiments of the present invention.

Referring now to FIG. 1, an embodiment is shown of an autonomous aerial vehicle (aerial vehicle) 20. As used herein, the term "aerial vehicle" refers to an aerial vehicle capable of operating autonomously from a human operator to perform a predetermined function, such as deliver a payload or package for example. The aerial vehicle 20 includes a fuselage 22 that supports at least one thrust device 24. In an embodiment, the aerial vehicle 20 can include a plurality of thrust devices 24A and 24B, or four thrust devices arranged about the periphery of the fuselage 22. In an embodiment, the thrust devices 24 may include a propeller member that can rotate to produce thrust. The vertical and horizontal components of the thrust allow the changing of the altitude, lateral movement, and orientation (attitude) of the aerial vehicle 20. The thrust devices 24 may be configurable to provide both lift (vertical thrust) and lateral thrust (horizontal thrust). Thrust devices 24 may be directed to other forms of propulsion, for example, a turbine (or jet) engine, a ramjet, and a rocket. The aerial vehicle 20 may include one or more power sources 25 (e.g., a battery) to provide power for the at least one thrust device 24.

The fuselage 22 and thrust devices 24 may be sized and configured to carry a payload/package (payload) 26. The payload/package (payload) 26 is an article purchased or otherwise requested by a customer to be delivered to a designated destination. The payload 26 can be releasably coupled to the fuselage 22.

The aerial vehicle 20 may include one or more coupling devices 36. As discussed herein, in some embodiments the coupling device 36 engages a coupling device 36 on a service aerial vehicle during the power source transfer process to maintain the pair of aerial vehicles in a fixed relationship during the transfer process. The one or more coupling devices 36 may be any suitable mechanical, electromechanical or magnetic mechanism for engaging another aerial vehicle.

An aerial vehicle 20 acting as a service aerial vehicle may additionally include one or more spare power sources 25 and one or more transfer members 34. The transfer member 34 may be a transfer arm that extends from a side of the fuselage 22. The transfer arm may be an expandable or extendable member that may be extended or retracted for the power source transfer process. The expandable transfer arm may be actuated by hydraulic, pneumatic, electromechanical (motor with a power screw) or with magnetic (solenoid or linear actuator) assemblies.

The aerial vehicle 20 may include a controller 38 that is responsive to operation control methods embodied in application code. These methods can be embodied in computer instructions written to be executed by the one or more processors, such as in the form of software. The controller 38 is coupled transmit and receive signals from the thrust devices 24, the transfer member 34 and the coupling device 36 to determine and change their operational states (e.g. extend/retract transfer member 34, adjust lift from thrust devices 24). The controller 38 may further be coupled to one or more sensor devices that enable the controller to determine the position, orientation, and altitude of the aerial vehicle 20. The one or more sensor devices may include an altimeter 40, a gyroscope or accelerometers 42 or a global positioning satellite (GPS) system 44.

Figure 2:
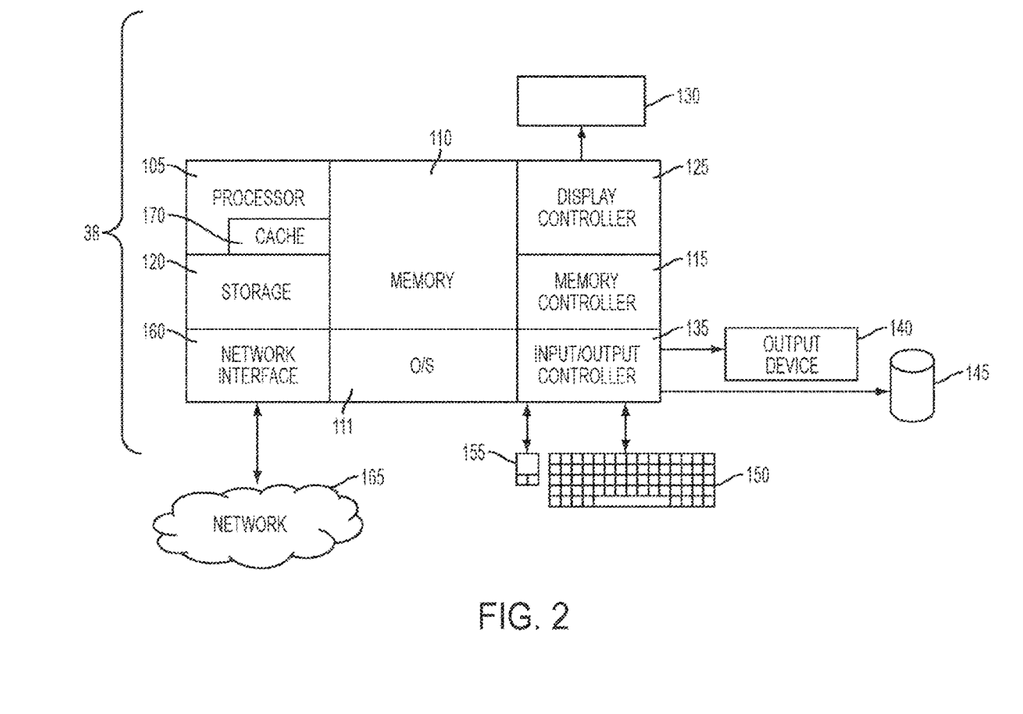
FIG. 2 depicts a block diagram of a controller for an autonomous aerial vehicle according to one or more embodiments of the present invention.

FIG. 2 illustrates a block diagram of a controller 38 for use in implementing a system or method according to one or more embodiments of the present invention. The systems and methods described herein may be implemented in hardware, software (e.g., firmware), or a combination thereof.

As illustrated in FIG. 2, the controller 38 may include at least one processor 105, memory 110 coupled to a memory controller 115, and one or more input devices 145 and/or output devices 140, such as peripheral or control devices that are communicatively coupled via a local I/O controller 135. These devices 140 and 145 may include, for example, battery sensors, position sensors (ex., altimeter 40, accelerometer 42, GPS 44), indicator/identification lights, and the like. Input devices such as a conventional keyboard 150 and mouse 155 may be coupled to the I/O controller 135 when the aerial vehicle 20 is docked to allow personnel to service or input information. The I/O controller 135 may be, for example, one or more buses or other wired or wireless connections. The I/O controller 135 may include additional elements that have been omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 may be a custom made or commercially available processor, a central processing unit (CPU), an auxiliary processor among several processors associated with the controller 38, a semiconductor based microprocessor (in the form of a microchip or chip set), a macro processor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. The memory 110 may also include an operating system (OS) 111. The OS 111 may control the execution of other computer programs and provides scheduling, input-output control, file and data management, memory management, and communication control and related services related to the operation of aerial vehicle 20. Additional data, including, for example, instructions for the processor 105 or other retrievable information, may be stored in storage 120, which may be a storage device such as a hard disk drive or solid state drive.

The controller 38 may further include a display controller 125 coupled to a user interface or display 130. The display 130 may be, for example, a liquid crystal display (LCD) screen. In addition, the display 130 may include a plurality of LED status lights. The controller 38 may further include a network interface 160 for coupling to a network 165. The network 165 may be an IP-based network for communication between the controller 38 and an external server, a client or the like via a broadband connection. The network 165 may be a satellite network. The network 165 transmits and receives data between the controller 38 and external systems. An external system may be another aerial vehicle 20 or an origination location of the aerial vehicle 20 or service location for the aerial vehicle 20, in which the transmitting and receiving of data allows the controller 38 to identify the other aerial vehicle 20, origination location of the aerial vehicle 20 or service location for the aerial vehicle 20 to determine when one or more power sources and/or aerial vehicle components are to be transferred from a service aerial vehicle 20 to another aerial vehicle 20. The network 165 may be a managed IP network administered by a service provider. The network 165 may be implemented in a wireless fashion, e.g., using wireless protocols and technologies, such as WiFi, WiMax, satellite, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 3:
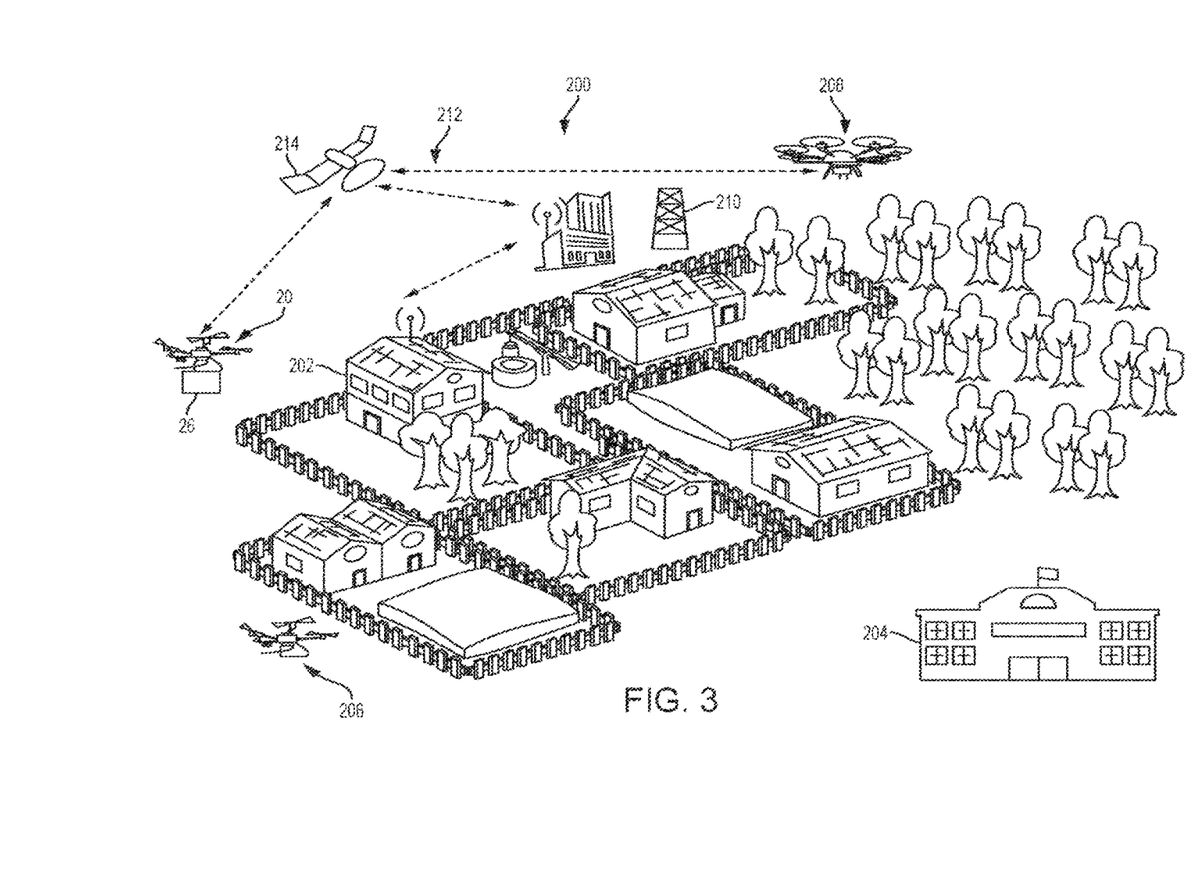
FIG. 3 depicts a perspective view of a package delivery system using an autonomous aerial vehicle according to one or more embodiments of the present invention.

FIG. 3 illustrates a package or payload delivery system 200 according to one or more embodiments of the present invention. The package or payload delivery system 200 may include a plurality of autonomous aerial vehicles that act as delivery aerial vehicles and service aerial vehicles, for example, delivery aerial vehicle 20 and service aerial vehicles 206 and 208, to deliver one or more payloads from an originating location 202 (e.g., a warehouse) to a delivery destination location 204 (e.g., a customer). The system 200 can be configured to assist in the delivery of the payload 26 to destination locations where the aerial vehicle 20 that initially receives the payload is unable to complete the delivery. The aerial vehicle 20 may be unable to complete the delivery for a variety of reasons, for example, the delivery location 204 may be beyond the range of the aerial vehicle 20 based on an aerial vehicle status (e.g., a current power level or damage assessment) of the aerial vehicle 20. Accordingly, the system 200 can provide the in-flight replacement or recharge of at least one power source 25 of delivery aerial vehicle 20 and/or replacement of one or more aerial vehicle components by one or more service aerial vehicles 206 and 208.

The system 200 provides for the in-flight transfer of power sources 25 or aerial vehicle component assistance (mechanical or electrical parts damaged or otherwise designated for replacement or installation) to allow the aerial vehicle 20 to transfer the payload 26 to the final destination without landing even though the aerial vehicle 20 would not have originally had enough power or too much damage to reach the final destination thereby improving aerial vehicle range and the efficiency of the delivery. The system 200 may include a communication system 212 that allows the transmission of signals to the originating location 202, service location 210, and aerial vehicles 20, 206, 208, such as through a satellite based communications link 214. It should be appreciated that the communications link 214 may be cellular, radio frequency or a mesh communications type network. The signals transmitted to the aerial vehicles 20, 206, 208 may include locations to pick up, drop off, power source assistance (replacement/recharge), aerial vehicle component assistance, aerial vehicle status indication, or the like. The signals transmitted to the aerial vehicles 20, 206, 208 may further include identification information that allows the service aerial vehicle 206, 208 to dynamically identify an assigned delivery aerial vehicle 20 prior to engaging in the in-flight transfer process.

Figure 4:
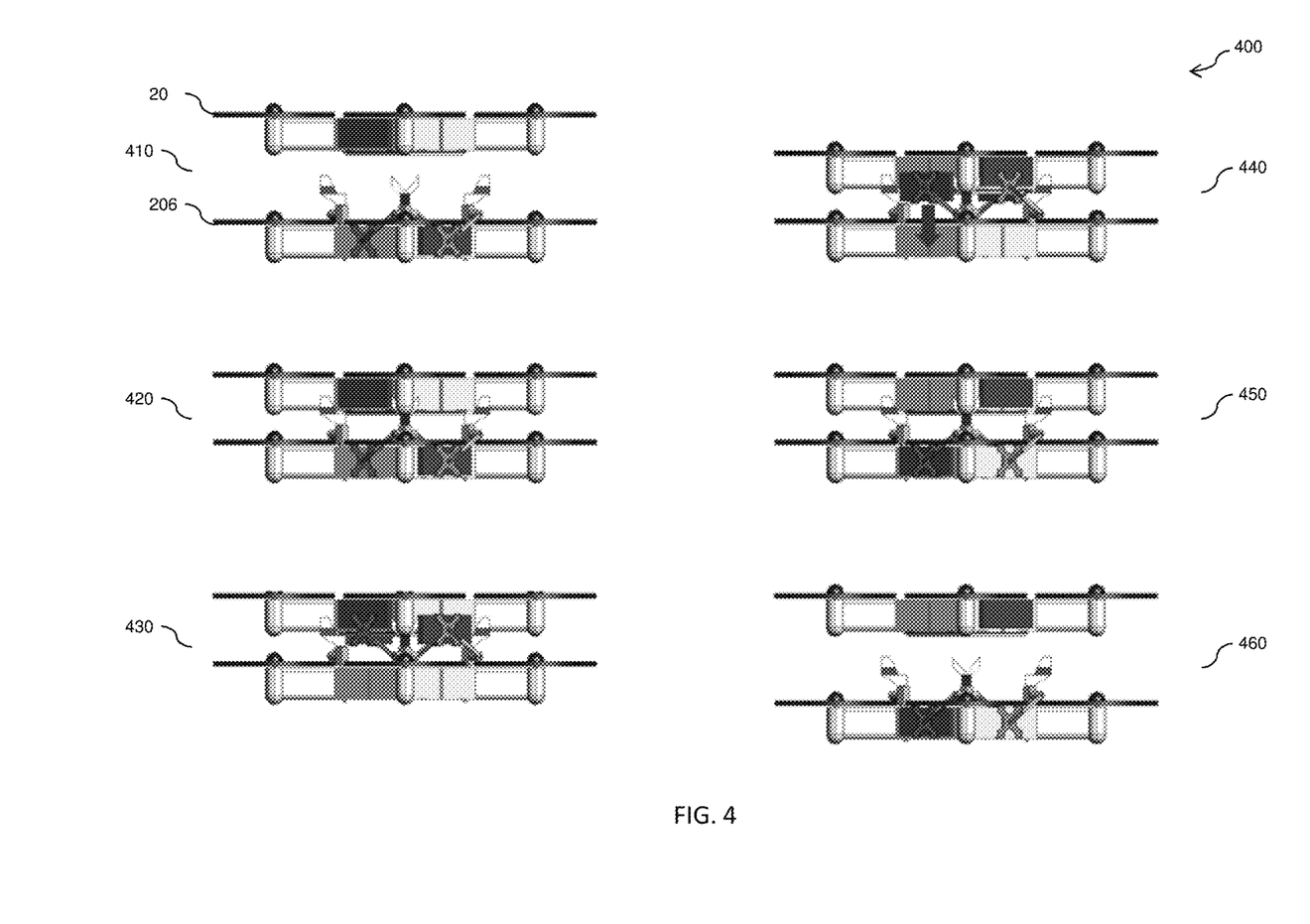
FIG. 4 is diagram illustrating an aerial vehicle service arrangement according to one or more embodiments of the present invention.

Referring now to FIG. 4, there is illustrated an aerial vehicle service arrangement 400 in accordance with one or more embodiments of the invention. The aerial vehicle service arrangement 400 can occur in response to a service request from a delivery aerial vehicle or in response to a power and range determination or damage assessment and delivery schedule for a delivery aerial vehicle calculated at, for example, an originating location 202.

As illustrated, the aerial vehicle service arrangement 400 can begin with arrangement 410 where a first aerial vehicle (delivery aerial vehicle 20) and a second aerial vehicle (service aerial vehicle 206) are aligned (vertically and horizontally) in order for the service aerial vehicle 206 to provide service to the delivery aerial vehicle 20. The alignment can occur using thrust devices 24 of delivery aerial vehicle 20 and service aerial vehicle 206. The alignment can also occur by establishing a communication linkage between the delivery aerial vehicle 20 and the service aerial vehicle 206, such as via radio frequency or a Bluetooth connection. The alignment can additionally use any one of electronic sensing (radar/sonar), a Global Positioning System (GPS), and optical sensors.

Once aligned, the aerial vehicle service arrangement 400 can proceed to arrangement 420 where a docking procedure can be conducted to couple the delivery aerial vehicle 20 and the service aerial vehicle 206. The coupling can occur using at least one coupling device 36 associated with the delivery aerial vehicle 20 and at least one coupling device 36 associated with the service aerial vehicle 206. The coupling between the delivery aerial vehicle 20 and the service aerial vehicle 206 can be a magnetic, mechanical or electromechanical connection.

Upon coupling of the delivery aerial vehicle 20 and the service aerial vehicle 206, the aerial vehicle service arrangement 400 can proceed to arrangement 430 where service is initiated by the service aerial vehicle 206 to the delivery aerial vehicle 20. The service aerial vehicle 206 can provide a variety of services to the delivery aerial vehicle 20 while in-flight. For example, service aerial vehicle 206 can replace one or more power sources (e.g., a battery) 25 or aerial vehicle components (not shown) of delivery aerial vehicle 20 (illustrated in arrangement 440), install one or more power sources 25 for delivery aerial vehicle 20 or transfer power from one or more power sources 25 installed on the service aerial vehicle 206 to the delivery aerial vehicle 20.

The services provided to the delivery aerial vehicle 20 by the service aerial vehicle 206 can be dependent on how the delivery aerial vehicle 20 and service aerial vehicle 206 can be coupled. For example, the replacement or installation of one or more power sources 25, or any other components of the delivery aerial vehicle 20 (e.g., mechanical or electrical parts damaged or otherwise designated for replacement or installation), from the service aerial vehicle 206 to the delivery aerial vehicle 20 can occur when the service aerial vehicle 206 and delivery aerial vehicle 20 are coupled via a magnetic, mechanical or electromechanical connection. The transfer of power from one or more power sources 25 installed on the service aerial vehicle 206 to the delivery aerial vehicle 20 can occur when the service aerial vehicle 206 and delivery aerial vehicle 20 are coupled via an electromechanical connection.

In an arrangement where the replacement or installation of one or more power sources 25 from the service aerial vehicle 206 to the delivery aerial vehicle 20 can occur, the aerial vehicle service arrangement 400 can proceed to arrangement 440 where the service aerial vehicle 206 can use one or more transfer members 34 to replace and install one or more power sources 25 on delivery aerial vehicle 20. The replacement or installation of one or more power sources 25 to delivery aerial vehicle 20 can be dependent on a number of open power source locations on the delivery aerial vehicle 20. For example, the delivery aerial vehicle 20 may be equipped with 4 power source locations. Depending on how the delivery aerial vehicle 20 has been fitted, a decision which could be made at an originating location in response to power determinations associated with scheduled deliveries for the aerial vehicle 20, the aerial vehicle 20 may have some or all of the 4 power source locations filled with a power source 25. Accordingly, the service aerial vehicle 206 can take into account how the delivery aerial vehicle 20 is fitted when replacing or installing one or more power sources 25.

In an arrangement where the delivery aerial vehicle 20 and the service aerial vehicle 206 are coupled via an electromechanical connection, power sources 25 on the delivery aerial vehicle 20 can be bypassed. Accordingly, both the delivery aerial vehicle 20 and service aerial vehicle 206 can be powered by power sources 25 associated with the service aerial vehicle 206 during replacement or installation of one or more power sources 25 of the delivery aerial vehicle 20.

Once the one or more power sources 25 have been replaced or installed on the delivery aerial vehicle 20, the aerial vehicle service arrangement 400 can proceed to arrangement 450 where the delivery aerial vehicle 20 can validate proper electrical connectivity and operation of the replaced or installed power source(s) 25. The delivery aerial vehicle 20 and/or service aerial vehicle 206 can communicate with each other, as well as the originating location 202 that service to the delivery aerial vehicle 20 is complete. Aerial vehicle components can be replaced/installed in a manner similar to the replacement/installation of the one or more power sources 25.

In an arrangement where transfer of power from one or more power sources 25 installed on the service aerial vehicle 206 to the delivery aerial vehicle 20, the aerial vehicle service arrangement 400 can instruct the service aerial vehicle 206 to travel with the delivery aerial vehicle 20 on a delivery path assigned to the delivery aerial vehicle 20 until an assigned amount of power has been transferred to the delivery aerial vehicle 20. The transfer of power by the service aerial vehicle 206 to the delivery aerial vehicle 20 can occur, for example, when the delivery aerial vehicle 20 has been fitted with non-standard power sources 25.

Upon validation of proper electrical connectivity and operation of the replaced or installed power source(s) 25 by the delivery aerial vehicle 20 or validation that assigned amount of power has been transferred to the delivery aerial vehicle 20, the aerial vehicle service arrangement 400 can proceed to arrangement 460 where de-coupling of the delivery aerial vehicle 20 and the service aerial vehicle 206 can occur. Accordingly, the delivery aerial vehicle 20 can continue along the scheduled delivery path assigned to the delivery aerial vehicle 20 and the service aerial vehicle 206 can provide service to additional delivery aerial vehicles 20 or return to the originating location 202 or service location 210.

Figure 5A:
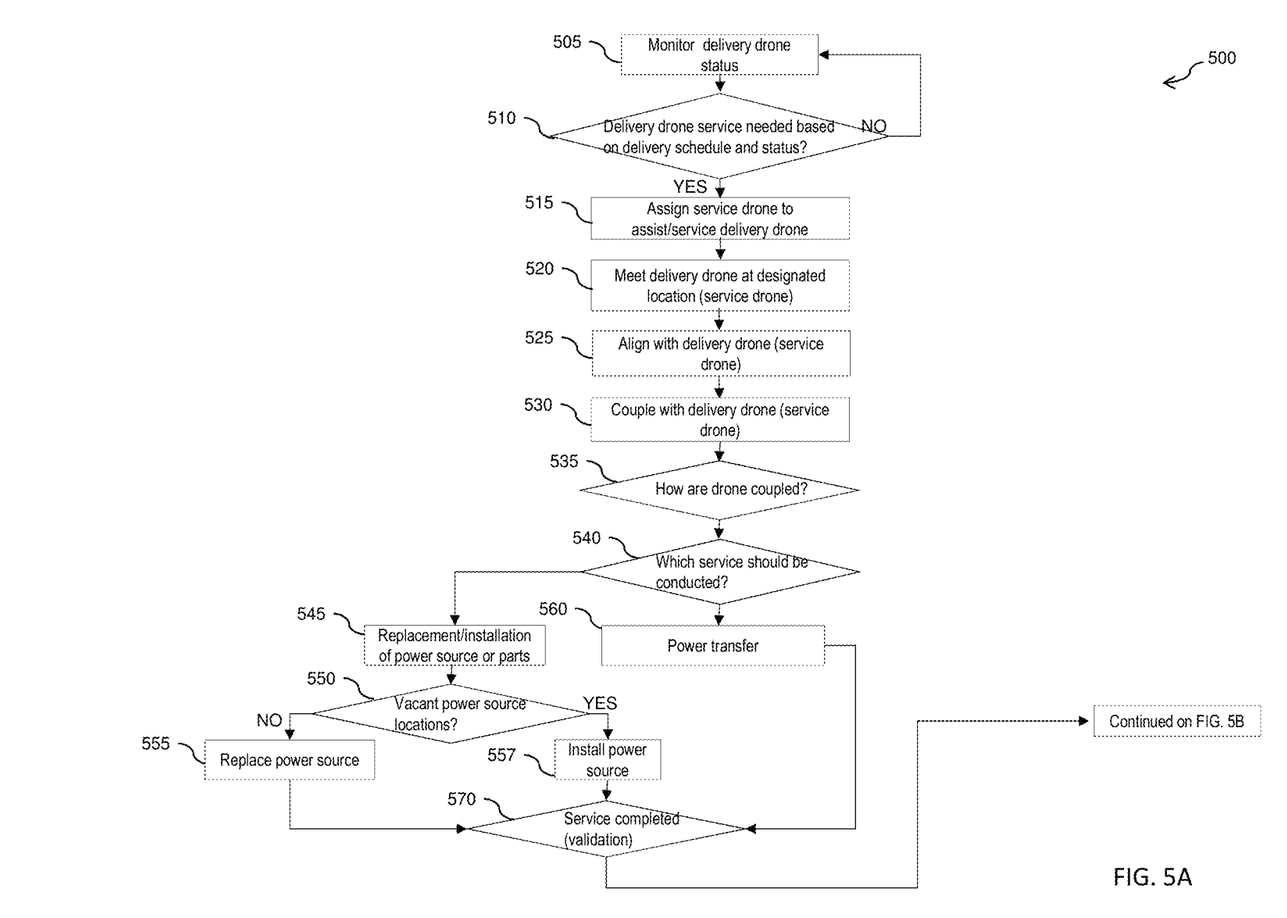
FIG. 5A is a flow diagram of a method for aerial vehicle in-flight servicing according to one or more embodiments of the present invention.

Now referring to FIG. 5, a flow diagram of a method 500 for aerial vehicle in-flight servicing in accordance with one or more embodiments of the present invention. At block 505, an aerial vehicle status (e.g., power level indication and/or damage assessment) for an aerial vehicle (e.g., aerial vehicle 20) can be monitored. Monitoring of aerial vehicle 20 can occur in response to a power and range determination and delivery schedule for an aerial vehicle calculated at, for example, aerial vehicle 20 and/or an originating location 202. At block 510, a determination can be made by the aerial vehicle 20, the originating location 202 and/or the service location 210 whether service for aerial vehicle 20 is needed. For example, the delivery aerial vehicle 20, originating location 202 and/or service location 210 can compare a delivery schedule associated with the delivery aerial vehicle 20 with a current power level and/or aerial vehicle damage assessment associated with the delivery aerial vehicle 20 to determine whether the delivery aerial vehicle 20 can reach one or more destination locations associated with the delivery schedule for the deliver aerial vehicle 20.

In response to a determination that service is not needed by the aerial vehicle 20 and/or originating location 202, (i.e., the delivery aerial vehicle 20 can reach the one or more destination locations associated with the delivery schedule for the deliver aerial vehicle 20), the method 500 returns to block 505. In response to a determination that service is needed by the aerial vehicle 20, the originating location 202 and/or the service location 210, (i.e., a conflict in that the delivery aerial vehicle 20 cannot reach the one or more destination locations associated with the delivery schedule for the deliver aerial vehicle 20), at block 515, a service aerial vehicle (e.g., service aerial vehicles 206, 208) can be assigned to provide service to the delivery aerial vehicle 20. For example, the service aerial vehicle 206 may be equipped with a plurality of spare power sources and/or spare delivery aerial vehicle components.

At block 520, the service aerial vehicle 206 can meet the delivery aerial vehicle 20 at a designated location. At block 525, upon meeting at the designated location, the delivery aerial vehicle 20 and the service aerial vehicle 206 are aligned with one another. At block 530, once aligned, the delivery aerial vehicle 20 and the service aerial vehicle 206 can be coupled to one another, i.e., docking. The coupling can occur via one or more magnetic, mechanical or electromechanical connections between the delivery aerial vehicle 20 and the service aerial vehicle 206.

At block 535, in response to a service issue related to a power source for the delivery aerial vehicle 20, the service aerial vehicle 206 can determine how the service aerial vehicle 206 is coupled to the delivery aerial vehicle, e.g., magnetic, mechanical or electromechanical. Based on the coupling determination, at block 540, the service aerial vehicle 206 can further determine whether a service related to a power source replacement/installation or a power transfer should be conducted. The service aerial vehicle 206 can also be instructed by the originating location 202 what type of service should be conducted on the delivery aerial vehicle 20.

Figure 5B:
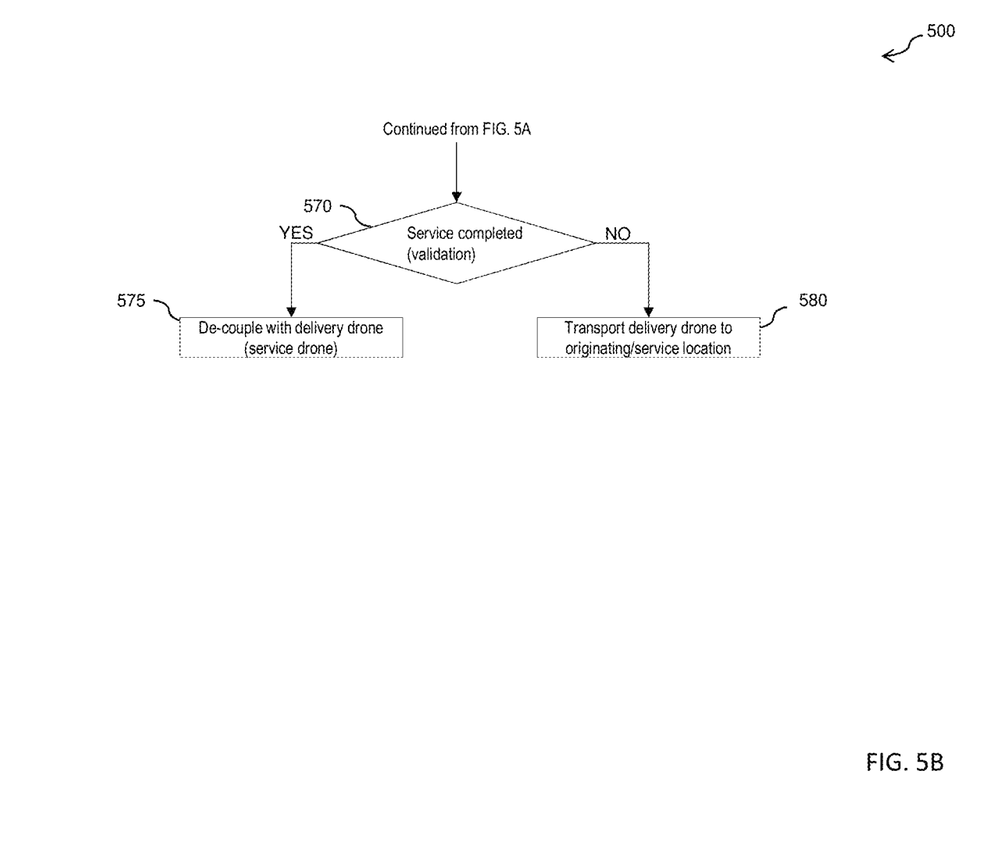
FIG. 5B is a continuation of flow diagram 5A according to one or more embodiments of the present invention.

At block 545, when a part replacement/installation for the delivery aerial vehicle 20 has been determined or instructed, the service aerial vehicle 206 can replace one or more power sources 25 or aerial vehicle components on the delivery aerial vehicle 20. At block 545, when a power source 25 replacement/installation for the delivery aerial vehicle 20 has been determined or instructed and the service aerial vehicle 206 and delivery aerial vehicle 20 are coupled via a magnetic, mechanical or electromechanical connection, the service aerial vehicle 206 can communicate with the delivery aerial vehicle to determine whether the delivery aerial vehicle 20 has any vacant power source locations. At block 550, based on the vacancy determination, the service aerial vehicle 206 can install one or more spare power sources 25 (e.g., one or more batteries) in vacant power source location of aerial vehicle 20 (block 557) when vacancies, or if there are no vacant power source locations on the delivery aerial vehicle 20, the service aerial vehicle 206 can replace one or more designated power sources 25 on the delivery aerial vehicle 20 with one or more spare power sources 25 transported by the service aerial vehicle 206 (block 555).

At block 560, a power transfer to the delivery aerial vehicle 20 has been determined or instructed, the service aerial vehicle 206 can transfer power from one or more spare power sources 25 transported by the service aerial vehicle 206 to the delivery aerial vehicle 20. The transfer of power from the service aerial vehicle 206 to the delivery aerial vehicle 20 can occur via an electromechanical connection.

At block 570, upon completion of the replacement/installation of the one or more power sources 25 or aerial vehicle components, or the transfer of power from the service aerial vehicle 206 to the delivery aerial vehicle 20, the delivery aerial vehicle 20 can validate that the power source/aerial vehicle component replacement/installation or power transfer by the service aerial vehicle 206 was or was not successful. If the power source/aerial vehicle component replacement/installation or power transfer by the service aerial vehicle 206 was successful, the method 500 proceeds to block 575 where the delivery aerial vehicle 20 and the service aerial vehicle 206 are de-coupled. Accordingly, the delivery aerial vehicle 20 can continue travel to one or more delivery destinations 204 based on the delivery schedule assigned to the delivery aerial vehicle 20, and the service aerial vehicle 206 can be assigned to service another delivery aerial vehicle 20 or return to the originating location 202. If the power source/aerial vehicle component replacement/installation or power transfer by the service aerial vehicle 206 was not successful, the method 500 proceeds to block 580 where the service aerial vehicle 206 remains coupled to the delivery aerial vehicle 20 and transports the delivery aerial vehicle 20 to the originating location 202 or service location 210 for further service.

Accordingly, a system, a method, and/or computer program product is disclosed herein that address issues (service) with a first aerial vehicle (e.g., a delivery aerial vehicle) while the aerial vehicle is in-flight using a second aerial vehicle (e.g., a service aerial vehicle). The second aerial vehicle can be equipped with at least two sliding racks, in which a sliding rack can be tasked with storing charged batteries and another sliding rack can be tasked with collecting spent/discharged batteries from the one or more delivery aerial vehicles.

The second aerial vehicle can establish a vertical and horizontal alignment with the first aerial vehicle. The alignment can be accomplished using a number of techniques including electronic sensing (radar/sonar), GPS, and optical sensors. Once the second aerial vehicle is aligned with the first aerial vehicle within an acceptable tolerance, the second aerial vehicle can close a gap separating the two aerial vehicles. Fixtures mounted on the second aerial vehicle can be used to ensure an accurate final alignment between the two aerial vehicles. In response to the final alignment, a docking procedure can be implemented to couple the aerial vehicles. While coupled, the second aerial vehicle can service the first aerial vehicle, for example, replace one or more batteries associated with the first aerial vehicle in order to extend the delivery range of the first aerial vehicle. Mechanical actuators on transfer arms of the second aerial vehicle can be used to move the replacement batteries from the second aerial vehicle to the first aerial vehicle. After the replacement batteries are installed, the new batteries are activated and the used batteries are deactivated. The mechanical actuators can be used to move the used batteries from the first aerial vehicle to the second aerial vehicle. Following the completion of the used battery removal, the coupling between the two aerial vehicles is severed and the second aerial vehicle separates from the first aerial vehicle.

Both the first aerial vehicle and second aerial vehicle can include a contact based power transfer capability. Accordingly, upon coupling, electrical connectivity can be established between the first aerial vehicle and the second aerial vehicle. The power associated with the first aerial vehicle can be bypassed causing the second aerial vehicle to provide power to the first aerial vehicle while one or more batteries of the first aerial vehicle are replaced.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for aerial vehicle in-flight servicing, the method comprising:
    monitoring, using a processor, an aerial vehicle status of a delivery aerial vehicle;
    comparing, using the processor, the aerial vehicle status of the delivery aerial vehicle to a delivery schedule associated with the delivery aerial vehicle;
    assigning, using the processor, a service aerial vehicle to provide service in response to the aerial vehicle status conflicting with the delivery schedule associated with the delivery aerial vehicle;
    coupling the delivery aerial vehicle to the service aerial vehicle while the delivery aerial vehicle and service aerial vehicle are in-flight;
    providing, by the service aerial vehicle, power source assistance to the delivery aerial vehicle while the delivery aerial vehicle and service aerial vehicle are in-flight;
    decoupling the delivery aerial vehicle from the service aerial vehicle in response the power source assistance being successfully completed by the service aerial vehicle;
    based on a determination that the power source assistance to the delivery aerial vehicle was not successful completed, transporting the delivery aerial vehicle by the service aerial vehicle to an originating location of the service aerial vehicle,
    wherein power source assistance comprises identifying a vacant power source location on the delivery aerial vehicle and installing, by the service aerial vehicle, a charged battery in the vacant power source location.

2. The computer-implemented method of claim 1, wherein power source assistance comprises replacing one or more power sources associated with the delivery aerial vehicle.

3. The computer-implemented method of claim 2, wherein the one or more power sources are one or more batteries.

4. The computer-implemented method of claim 1, wherein power source assistance comprises installing one or more power sources on the delivery aerial vehicle.

5. The computer-implemented method of claim 1, wherein the service aerial vehicle comprises one or more transfer arms.

6. The computer-implemented method of claim 5, wherein the service aerial vehicle uses the one or more transfer arms to provide power source assistance to the delivery aerial vehicle.

7. A computer program product, the computer program product comprising a computer readable storage medium having program instructions embodied therewith, the program instructions readable by a processing circuit to cause the processing circuit to perform a method comprising:
    monitoring an aerial vehicle status of a delivery aerial vehicle;
    comparing the aerial vehicle status of the delivery aerial vehicle to a delivery schedule associated with the delivery aerial vehicle;
    assigning a service aerial vehicle to provide service in response to the aerial vehicle status conflicting with the delivery schedule associated with the delivery aerial vehicle;
    coupling the delivery aerial vehicle to the service aerial vehicle while the delivery aerial vehicle and service aerial vehicle are in-flight;
    providing power source assistance, by the service aerial vehicle, to the delivery aerial vehicle while the delivery aerial vehicle and service aerial vehicle are in-flight;
    decoupling the delivery aerial vehicle from the service aerial vehicle in response the power source assistance being successfully completed by the service aerial vehicle;
    based on a determination that the power source assistance to the delivery aerial vehicle was not successful completed, transporting the delivery aerial vehicle by the service aerial vehicle to an originating location of the service aerial vehicle,
    wherein power source assistance comprises identifying a vacant power source location on the delivery aerial vehicle and installing, by the service aerial vehicle, a charged battery in the vacant power source location.

8. The computer program product of claim 7, wherein power source assistance comprises installing one or more power sources on the delivery aerial vehicle.

9. The computer program product of claim 7, wherein power source assistance comprises replacing one or more power sources associated with the delivery aerial vehicle.

10. The computer program product of claim 9, wherein the one or more power sources are one or more batteries.

11. The computer program product of claim 7, wherein the service aerial vehicle comprises one or more transfer arms.

12. The computer program product of claim 11, wherein the service aerial vehicle uses the one or more transfer arms to provide power source assistance to the delivery aerial vehicle.

13. A computer system, comprising:
    a processor in communication with one or more types of memory, the processor configured to:

monitor an aerial vehicle status of a delivery aerial vehicle;

compare the aerial vehicle status of the delivery aerial vehicle to a delivery schedule associated with the delivery aerial vehicle;

assign a service aerial vehicle to provide service in response to the aerial vehicle status conflicting with the delivery schedule associated with the delivery aerial vehicle;

couple the delivery aerial vehicle to the service aerial vehicle while the delivery aerial vehicle and service aerial vehicle are in-flight;

provide power source assistance, by the service aerial vehicle, to the delivery aerial vehicle while the delivery aerial vehicle and service aerial vehicle are in-flight;

decoupling the delivery aerial vehicle from the service aerial vehicle in response the power source assistance being successfully completed by the service aerial vehicle;

based on a determination that the power source assistance to the delivery aerial vehicle was not successful completed, transporting the delivery aerial vehicle by the service aerial vehicle to an originating location of the service aerial vehicle, wherein power source assistance comprises identifying a vacant power source location on the delivery aerial vehicle and installing, by the service aerial vehicle, a charged battery in the vacant power source location.

14. The computer system of claim 13, wherein power source assistance comprises installing one or more power sources on the delivery aerial vehicle.

15. The computer system of claim 13, wherein the service aerial vehicle comprises one or more transfer arms.

16. The computer system of claim 13, wherein power source assistance comprises replacing one or more power sources associated with the delivery aerial vehicle.

17. The computer system of claim 16, wherein the one or more power sources are one or more batteries.

* * * * *